US012641545B2

(12) United States Patent (10) Patent No.: US 12,641,545 B2

Hu et al. (45) Date of Patent: May 26, 2026

(54) COMMUNICATION METHOD AND APPARATUS

(71) Applicant: HUAWEI TECHNOLOGIES CO., LTD., Shenzhen (CN)

(72) Inventors: Dan Hu, Beijing (CN); Xu Zhang, Beijing (CN); Bingyu Qu, Beijing (CN); Yi Long, Beijing (CN); Feng Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 497 days.

(21) Appl. No.: 18/161,224

(22) Filed: Jan. 30, 2023

(65) Prior Publication Data

US 2023/0171704 A1 Jun. 1, 2023

Related U.S. Application Data

(63) Continuation of application No. PCT/CN2021/106946, filed on Jul. 16, 2021.

(30) Foreign Application Priority Data

Jul. 31, 2020 (CN) .......................... 202010763590.9

(51) Int. Cl.
  *H04W 52/14* (2009.01)
  *H04W 52/08* (2009.01)
  *H04W 52/24* (2009.01)

(52) U.S. Cl.
  CPC ......... *H04W 52/146* (2013.01); *H04W 52/08* (2013.01); *H04W 52/242* (2013.01)

(58) Field of Classification Search
  CPC . H04W 52/38; H04W 48/04; H04W 74/0833; H04W 52/24; H04W 72/542;
  (Continued)

(56) References Cited

U.S. PATENT DOCUMENTS

2016/0050631 A1* 2/2016 Wen .................... H04W 52/242
                                                            455/522
2017/0026915 A1* 1/2017 Madan ................ H04W 52/244
  (Continued)

FOREIGN PATENT DOCUMENTS

CN       102870457 A      1/2013
CN       108811062 A     11/2018
  (Continued)

OTHER PUBLICATIONS

Office Action issued in CN202010763590.9, dated Jan. 4, 2024, 12 pages.
  (Continued)

*Primary Examiner* — Tu X Nguyen

(57) ABSTRACT

Embodiments of the present disclosure provide a communication method and an apparatus, to resolve a problem of how to determine uplink transmit power when no uplink carrier corresponds to a downlink carrier. The method includes: A terminal device obtains first information, where the first information is a path loss value or a power offset value of a first uplink carrier, and the first information is used to determine first transmit power of first uplink transmission on the first uplink carrier. The terminal device uses to send the first uplink transmission on the first uplink carrier.

16 Claims, 7 Drawing Sheets

Core network device 210

Radio access network device 220

Terminal device 230

Terminal device 240

(58) Field of Classification Search
CPC ............. H04W 52/146; H04W 52/242; H04W
74/002; H04W 52/365; H04W 52/283;
H04W 72/0457; H04W 72/04; H04W
52/245; H04W 52/18
See application file for complete search history.

(56)                   References Cited

U.S. PATENT DOCUMENTS

| | | | |
|---|---|---|---|
| 2019/0053080 A1* | 2/2019 | Ryu ....................... | H04L 5/0048 |
| 2022/0124629 A1* | 4/2022 | Xing .................... | H04W 52/02 |

FOREIGN PATENT DOCUMENTS

| | | |
|---|---|---|
| CN | 108811063 A | 11/2018 |
| CN | 110337140 A | 10/2019 |
| CN | 110999167 A | 4/2020 |
| CN | 111034324 A | 4/2020 |
| EP | 3618511 A1 | 3/2020 |
| EP | 3648522 A1 | 5/2020 |
| WO | 2018062957 A1 | 4/2018 |

OTHER PUBLICATIONS

PCT International Search Report for Application No. PCT/CN2021/
106946 dated Jul. 31, 2020, 83 pages.
Office Action issued in IN Application No. 202347009502, dated
Sep. 22, 2023, with English translation, 7 pages.
Extended European Search Report issued in EP21850082.5, dated
Dec. 12, 2023, 10 pages.

\* cited by examiner

Core network
device 210

Radio access
network device 220

Terminal
device 230

Terminal
device 240

COMMUNICATION METHOD AND APPARATUS

CROSS-REFERENCE TO RELATED APPLICATIONS

PCT/CN2021/106946, filed on Jul. 16, 2021, which claims priority to Chinese Patent Application No. 202010763590.9, filed on Jul. 31, 2020. The disclosures of the aforementioned applications are hereby incorporated by reference in their entireties.

This application is a continuation of International Application No.

TECHNICAL FIELD

The present disclosure relates to the field of communication technologies, and in particular, to a communication method and an apparatus.

BACKGROUND

Compared with long term evolution (LTE), 5G new radio (NR) has a higher working frequency, and a higher penetration loss and a higher distance loss in uplink signal transmission. Therefore, a coverage area of an NR uplink (NUL) carrier is smaller than a coverage area of an NR downlink (NDL) carrier by about 14 dB. As a result, a cell edge user cannot access a cell by using an uplink, and consequently, a success rate of accessing the cell by the cell edge user is reduced. To enhance uplink coverage, a supplementary uplink (SUL) carrier is introduced into 5G NR. The SUL carrier has a low frequency, and can supplement uplink coverage to some extent.

In future network deployment, an NUL carrier and an SUL carrier may be deployed at different sites to reduce costs. For example, an NUL #1 carrier and an NDL #1 carrier are deployed at a site A, an NUL #2 carrier, an SUL carrier, and an NDL #2 carrier are deployed at a site B, and a coverage area of the SUL carrier at the site B is large, so that user equipment (UE) accessing the NUL #1 carrier can access the SUL carrier.

During uplink transmission, UE generally needs to obtain transmit power of an uplink carrier based on path loss information. Because a coverage area of the uplink carrier and a coverage area of a downlink carrier are approximately the same, the UE can measure a downlink path loss value by receiving a downlink reference signal transmitted by the downlink carrier, and use the downlink path loss value as an uplink path loss estimation value. However, for an uplink carrier that has no corresponding downlink carrier, because no corresponding downlink path loss value may be used as an uplink path loss estimate value, uplink transmit power of the uplink carrier cannot be obtained. For example, in a scenario in which an NUL carrier and an SUL carrier are deployed at different sites, the SUL carrier has no corresponding downlink carrier, and cannot receive a downlink reference signal used to measure a path loss value and cannot obtain corresponding uplink path loss information. For example, the site A and the site B are used as an example. It is assumed that UE may access the NUL #1 carrier at the site A and the SUL carrier at the site B in uplink, and may access the NDL #1 carrier at the site A in downlink. Because the NUL #1 carrier and the SUL carrier correspond to different base station sites, and the SUL carrier has no corresponding downlink carrier, the UE cannot receive a downlink reference signal corresponding to the SUL carrier and cannot measure a downlink path loss, cannot obtain an uplink path loss estimation value, and consequently cannot perform power control on the SUL carrier.

SUMMARY

Embodiments of the present disclosure provide a power control method and an apparatus, to resolve a problem of how to determine an uplink transmit power when there is no uplink carrier corresponding to a downlink carrier.

According to a first aspect, an embodiment of the present disclosure provides a communication method. The method includes: A terminal device obtains first information, where the first information is a path loss value or a power offset value of a first uplink carrier, and the first information is used to determine first transmit power of first uplink transmission on the first uplink carrier. The terminal device uses the first transmit power to send the first uplink transmission on the first uplink carrier. In this embodiment of the present disclosure, a first network device determines an uplink path loss value or an uplink power offset value, and notifies the uplink path loss value or the uplink power offset value to the terminal device, so that the terminal device can determine transmit power of other uplink transmission by using the path loss value or the power offset value notified by the first network device, and can obtain uplink transmit power for an uplink carrier that has no corresponding downlink carrier.

In a possible design, the first transmit power is determined by using a target power value, the path loss value, a path loss compensation factor, a quantity of transmission resource blocks, a modulation and coding scheme, and a closed-loop power control parameter, and the path loss value is the path loss value of the first uplink carrier. In the foregoing design, when transmit power of uplink transmission on the first uplink carrier is determined, the transmit power of the uplink transmission on the first uplink carrier may be accurately determined based on the path loss value of the first uplink carrier.

In a possible design, the first information may be carried in downlink control information.

In a possible design, the first information may alternatively be carried on a media access control (MAC) control element (MAC control element, MAC CE).

In a possible design, the first information is carried in radio resource control (RRC) signaling.

In a possible design, the terminal device may further send second uplink transmission to the first network device on the first uplink carrier, and the first information is related to the second uplink transmission. In the foregoing design, the terminal device sends the second uplink transmission on the first uplink carrier, so that the first network device can determine the first information based on the second uplink transmission.

In a possible design, the terminal device sends transmit power information of the second uplink transmission, where the first information is related to transmit power of the second uplink transmission. In the foregoing design, the terminal device reports the transmit power of the second uplink transmission to the first network device, so that the first network device can determine the first information based on the transmit power and received power of the second uplink transmission.

In a possible design, the first uplink carrier is an SUL carrier of a second uplink carrier. The foregoing design can reduce a quantity of SUL sites to be deployed, reduce a UL transmission delay, improve an uplink capacity, and better support mobility.

In a possible design, a serving cell in which the first uplink carrier is located and a serving cell in which the second uplink carrier is located are a same serving cell: or the first uplink carrier and the second uplink carrier are configured by using an SIB1.

In a possible design, after receiving the path loss value of the first uplink carrier, the terminal device determines second transmit power of fourth uplink transmission on the first uplink carrier based on the first information; and the terminal device uses the second transmit power to send the fourth uplink transmission on the first uplink carrier, where a time interval between a receiving moment of the first information and a sending moment of the fourth uplink transmission does not exceed a preset threshold. By using the foregoing design, a quantity of times of obtaining the first information can be reduced, so that resource overheads can be reduced.

In a possible design, before sending the second uplink transmission, the terminal device may send third uplink transmission, and the third uplink transmission is sent to a second network device on the second uplink carrier. The third uplink transmission may be uplink transmission previous to the second uplink transmission, and the second uplink transmission may be the $1^{st}$ uplink transmission sent by the terminal device on the first uplink carrier after uplink handover.

According to a second aspect, an embodiment of the present disclosure provides a communication method. The method includes: A terminal device obtains first information, where the first information is a path loss value or a power offset value of a first uplink carrier, and the first information is used to determine power headroom of fifth uplink transmission on the first uplink carrier; and the terminal device sends the power headroom to a first network device. In this embodiment, the first network device determines an uplink path loss value or an uplink power offset value, and notifies the uplink path loss value or the uplink power offset value to the terminal device, so that the terminal device can determine the power headroom by using the path loss value or the power offset value notified by the first network device, and can obtain power headroom for an uplink carrier that has no corresponding downlink carrier.

In a possible design, the power headroom is determined by using a maximum transmit power value, a target power value, the path loss value, a path loss compensation factor, a quantity of transmission resource blocks, a modulation and coding scheme, and a closed-loop power control parameter, and the path loss value is the path loss value of the first uplink carrier. In the foregoing design, when the power headroom is determined, power headroom of uplink transmission on the first uplink carrier may be accurately determined based on the path loss value of the first uplink carrier.

In a possible design, the power headroom is determined by using a maximum transmit power value, a target power value, a path loss value, a path loss compensation factor, a quantity of transmission resource blocks, a modulation and coding scheme, a closed-loop power control parameter, and a power offset value, and the path loss value is a path loss value of a second uplink carrier. In the foregoing design, when the power headroom is determined, power headroom of uplink transmission on the first uplink carrier may be accurately determined based on the power offset value.

In a possible design, the first information may be carried in downlink control information.

In a possible design, the first information may alternatively be carried on a MAC CE.

In a possible design, the first information is carried in RRC signaling.

In a possible design, the terminal device sends sixth uplink transmission to the first network device on the first uplink carrier, where the first information is related to the second uplink transmission. In the foregoing design, the terminal device sends the sixth uplink transmission on the first uplink carrier, so that the first network device can determine the first information based on the sixth uplink transmission.

In a possible design, the terminal device sends transmit power information of the sixth uplink transmission, where the first information is related to transmit power of second uplink transmission. In the foregoing design, the terminal device reports the transmit power of the sixth uplink transmission to the first network device, so that the first network device can determine the first information based on the transmit power and received power of the sixth uplink transmission.

In a possible design, the first uplink carrier is an SUL carrier of a second uplink carrier. The foregoing design can reduce a quantity of SUL sites to be deployed, reduce a UL transmission delay, improve an uplink capacity, and better support mobility.

In a possible design, a serving cell in which the first uplink carrier is located and a serving cell in which the second uplink carrier is located are a same serving cell; or the first uplink carrier and the second uplink carrier are configured by using an SIB1.

According to a third aspect, an embodiment of the present disclosure provides a communication method. The method includes: A first network device determines first information, where the first information is a path loss value or a power offset value of a first uplink carrier, and the first information is used to determine transmit power of first uplink transmission on the first uplink carrier; and the first network device sends the first information. In this embodiment, the first network device determines an uplink path loss value or an uplink power offset value, and notifies the uplink path loss value or the uplink power offset value to the terminal device, so that the terminal device can determine transmit power of other uplink transmission by using the path loss value or the power offset value notified by the first network device, and can obtain uplink transmit power for an uplink carrier that has no corresponding downlink carrier.

In a possible design, the first network device receives second uplink transmission sent by the terminal device on the first uplink carrier; and when determining the first information, the first network device may determine the first information based on the second uplink transmission. In the foregoing design, the terminal device sends the second uplink transmission on the first uplink carrier, so that the first network device can determine the first information based on the second uplink transmission.

In a possible design, the first network device receives transmit power information of the second uplink transmission. When determining the first information based on the second uplink transmission, the first network device may measure the second uplink transmission to obtain a measurement value. The first network device determines the first information based on the transmit power information and the measurement value of the second uplink transmission. In the foregoing design, the terminal device reports transmit power of the second uplink transmission to the first network device, so that the first network device can determine the first information based on the transmit power and received power of the second uplink transmission.

In a possible design, the measurement value of the second uplink transmission may be determined based on reference signal received power (RSRP), a received signal strength indicator (RSSI), reference signal received quality (RSRQ), or a signal to interference plus noise ratio (SINR).

In a possible design, the first uplink carrier is an SUL carrier of a second uplink carrier. The foregoing design can reduce a quantity of SUL sites to be deployed, reduce a UL transmission delay, improve an uplink capacity, and better support mobility. In a possible design, a serving cell in which the first uplink carrier is located and a serving cell in which the second uplink carrier is located are a same serving cell: or the first uplink carrier and the second uplink carrier are configured by using an SIB1.

According to a fourth aspect, an embodiment of the present disclosure provides a communication method. The method includes: A first network device determines first information, where the first information is a path loss value or a power offset value of a first uplink carrier, and the first information is used to determine power headroom of fifth uplink transmission on the first uplink carrier; and the first network device sends the first information. In this embodiment, the first network device determines an uplink path loss value or an uplink power offset value, and notifies the uplink path loss value or the uplink power offset value to the terminal device, so that the terminal device can determine power headroom of uplink transmission by using the path loss value or the power offset value notified by the first network device, and can obtain power headroom for an uplink carrier that has no corresponding downlink carrier.

In a possible design, the first network device receives sixth uplink transmission sent by the terminal device on the first uplink carrier; and when determining the first information, the first network device may determine the first information based on the sixth uplink transmission. In the foregoing design, the terminal device sends the sixth uplink transmission on the first uplink carrier, so that the first network device can determine the first information based on the sixth uplink transmission.

In a possible design, the first network device receives transmit power information of the sixth uplink transmission. When determining the first information based on the sixth uplink transmission, the first network device may measure the sixth uplink transmission to obtain a measurement value. The first network device determines the first information based on the transmit power information and the measurement value of the sixth uplink transmission. In the foregoing design, the terminal device reports transmit power of the sixth uplink transmission to the first network device, so that the first network device can determine the first information based on the transmit power and received power of the sixth uplink transmission.

In a possible design, the measurement value of the sixth uplink transmission may be determined based on RSRP, an RSSI, RSRQ, or an SINR.

In a possible design, the first uplink carrier is an SUL carrier of a second uplink carrier. The foregoing design can reduce a quantity of SUL sites to be deployed, reduce a UL transmission delay, improve an uplink capacity, and better support mobility.

In a possible design, a serving cell in which the first uplink carrier is located and a serving cell in which the second uplink carrier is located are a same serving cell: or the first uplink carrier and the second uplink carrier are configured by using an SIB1.

According to a fifth aspect, an embodiment of the present disclosure provides a communication apparatus. The apparatus may be a terminal device, or may be a chip in a terminal device. The apparatus may include a processing unit, a transceiver unit, and a receiving unit. It should be understood that the sending unit and the receiving unit herein may alternatively be a transceiver unit. When the apparatus is a terminal device, the processing unit may be a processor, and the sending unit and the receiving unit may be a transceiver. The communication device may further include a storage unit, and the storage unit may be a memory. The storage unit is configured to store instructions, and the processing unit executes the instructions stored in the storage unit, so that the terminal device performs the method according to any one of the first aspect or the possible designs of the first aspect, or the terminal device performs the method according to any one of the second aspect or the possible designs of the second aspect. When the apparatus is a chip in a terminal device, the processing unit may be a processor, and the sending unit and the receiving unit may be input/output interfaces, pins, circuits, or the like. The processing unit executes instructions stored in a storage unit, so that the chip performs the method according to any one of the first aspect or the possible designs of the first aspect, or the chip performs the method according to any one of the second aspect or the possible designs of the second aspect. The storage unit is configured to store instructions. The storage unit may be a storage unit (for example, a register or a cache) in the chip, or may be a storage unit (for example, a read-only memory or a random access memory) located outside the chip and in the terminal device.

According to a sixth aspect, an embodiment of the present disclosure provides a communication apparatus. The apparatus may be a network device, or may be a chip in the network device. The apparatus may include a processing unit, a transceiver unit, and a receiving unit. It should be understood that the sending unit and the receiving unit herein may alternatively be a transceiver unit. When the apparatus is a network device, the processing unit may be a processor, and the sending unit and the receiving unit may be a transceiver. The communication device may further include a storage unit, and the storage unit may be a memory. The storage unit is configured to store instructions, and the processing unit executes the instructions stored in the storage unit, so that a first network device performs the method according to any one of the third aspect or the possible designs of the third aspect, or a second network device performs the method according to any one of the fourth aspect or the possible designs of the fourth aspect. When the apparatus is a chip in a network device, the processing unit may be a processor, and the sending unit and the receiving unit may be input/output interfaces, pins, circuits, or the like. The processing unit executes instructions stored in a storage unit, so that the chip performs the method according to any one of the third aspect or the possible designs of the third aspect, or the chip performs the method according to any one of the fourth aspect or the possible designs of the fourth aspect. The storage unit is configured to store instructions. The storage unit may be a storage unit (for example, a register or a cache) in the chip, or may be a storage unit (for example, a read-only memory or a random access memory) located outside the chip and in the terminal device.

According to a seventh aspect, an embodiment of the present disclosure further provides a computer-readable storage medium. The computer-readable storage medium stores a computer program. When the computer program is run on a computer, the computer is enabled to perform the method according to the first aspect, the second aspect, the third aspect, or the fourth aspect.

According to an eighth aspect, an embodiment of the present disclosure further provides a computer program product including a program. When the computer program product is run on a computer, the computer is enabled to perform the method according to the first aspect, the second aspect, the third aspect, or the fourth aspect.

According to a ninth aspect, a communication apparatus is provided, including a processor, a communication interface, and a memory. The communication interface is configured to transmit information, and/or a message, and/or data between the apparatus and another apparatus. The memory is configured to store computer-executable instructions. When the apparatus runs, the processor executes the computer-executable instructions stored in the memory, so that the apparatus performs the method according to any one of the first aspect or the designs of the first aspect, or any one of the second aspect or the designs of the second aspect.

According to a tenth aspect, a communication apparatus is provided, including a processor, a communication interface, and a memory. The communication interface is configured to transmit information, and/or a message, and/or data between the apparatus and another apparatus. The memory is configured to store computer-executable instructions. When the apparatus runs, the processor executes the computer-executable instructions stored in the memory, so that the apparatus performs the method according to any one of the third aspect or the designs of the third aspect, or any one of the fourth aspect or the designs of the fourth aspect.

According to an eleventh aspect, an embodiment of the present disclosure provides a chip. The chip is coupled to a memory, and performs the method according to any one of the first aspect or the possible designs of the first aspect, or any one of the second aspect or the possible designs of the second aspect in embodiments of the present disclosure.

According to a twelfth aspect, an embodiment of the present disclosure provides a chip. The chip is coupled to a memory, and performs the method according to any one of the third aspect or the possible designs of the third aspect, or any one of the fourth aspect or the possible designs of the fourth aspect in embodiments of the present disclosure.

According to a thirteenth aspect, an embodiment of the present disclosure provides a chip. The chip includes a communication interface and at least one processor. The processor is run to perform the method according to any one of the first aspect or the designs of the first aspect, or any one of the second aspect or the possible designs of the second aspect in embodiments of the present disclosure.

According to a fourteenth aspect, an embodiment of the present disclosure provides a chip. The chip includes a communication interface and at least one processor. The processor is run to perform the method according to any one of the third aspect or the designs of the third aspect, or any one of the fourth aspect or the possible designs of the fourth aspect in embodiments of the present disclosure.

According to a fifteenth aspect, an embodiment of the present disclosure further provides a communication system. The communication system includes the terminal device according to the first aspect and the first network device according to the third aspect.

According to a sixteenth aspect, an embodiment of the present disclosure further provides a communication system. The communication system includes the terminal device according to the second aspect and the first network device according to the fourth aspect.

It should be noted that "coupling" in embodiments of the present disclosure indicates a direct combination or an indirect combination of two components.

DESCRIPTION OF EMBODIMENTS

To make objectives, technical solution, and advantages of embodiments of the present disclosure clearer, the following further describes embodiments of the present disclosure in detail with reference to the accompanying drawings.

A power control method provided in the present disclosure may be applied to various communication systems, for example, internet of things (IOT), narrow band internet of things (NB-IoT), long term evolution (LTE), a 5th generation (5G) communication system, an LTE and 5G hybrid architecture, a 5G new radio (NR) system, and a new communication system emerging in future communication development. The 5G communication system described in the present disclosure may include at least one of a non-standalone (NSA) 5G communication system and a standalone (SA) 5G communication system. Alternatively, the communication system may be a public land mobile communication network (PLMN), a device-to-device (D2D) network, a machine to machine (M2M) network, or another network.

Figure 1:
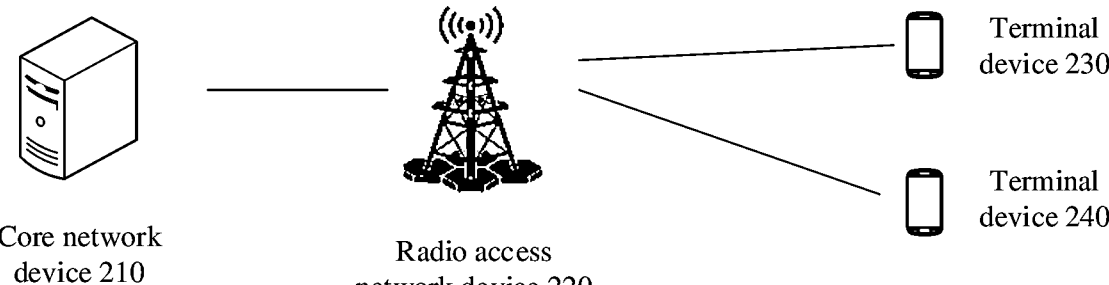
FIG. 1 is a schematic diagram of an architecture of a communication system according to an embodiment of the present disclosure.
Figure 2:
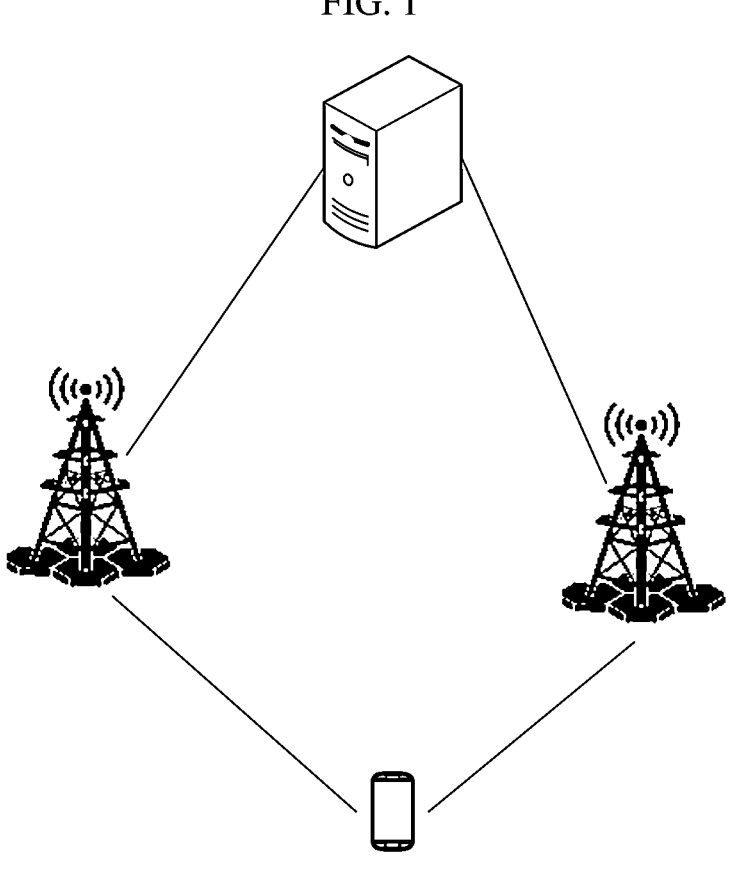
FIG. 2 is a schematic diagram of an architecture of a communication system according to an embodiment of the present disclosure.

As shown in FIG. 1, a communication system to which embodiments of the present disclosure are applied may include a core network device 210, an access network device 220, and at least one terminal device, for example, a terminal device 230 and a terminal device 240 in FIG. 1. The terminal device is connected to the access network device in a wireless manner, and the access network device is connected to the core network device in a wireless or wired manner. Alternatively, as shown in FIG. 2, a communication system to which embodiments of the present disclosure are applied may include a core network device, at least two access network devices, and at least one terminal device. The core network device and the access network device may be different physical devices that are independent of each other, or functions of the core network device and logical functions of the access network device may be integrated into a same physical device, or some functions of the core network device and some functions of the access network device may be integrated into one physical device. The terminal device may be located at a fixed position, or may be mobile. FIG. 1 and FIG. 2 are merely schematic diagrams. The communication system may further include another network device, for example, may further include a relay device and a backhaul device, which are not drawn in FIG. 1 and FIG. 2. Quantities of core network devices, access network devices, and terminal devices included in the communication system are not limited in embodiments of the present disclosure.

The terminal device in embodiments of the present disclosure is an entity that is on a user side and that is configured to receive or transmit a signal. The terminal device may be a device providing voice and data connectivity to a user, for example, a handheld device or a vehicle-mounted device having a wireless connection function. The terminal device may alternatively be another processing device connected to a wireless modem. The terminal device may communicate with one or more core networks by using a radio access network (RAN). The terminal device may alternatively be referred to as a wireless terminal, a subscriber unit, a subscriber station, a mobile station, a mobile, a remote station, an access point, a remote terminal, an access terminal, a user terminal, a user agent, a user device, user equipment, or the like. The terminal device may be a mobile terminal, for example, a mobile phone (or referred to as a "cellular" phone), or a computer that has a mobile terminal. For example, the terminal device may be a portable, pocket-sized, handheld, computer built-in, or vehicle-mounted mobile apparatus, which exchanges a voice and/or data with the radio access network. For example, the terminal device may alternatively be a device such as a personal communication service (PCS) phone, a cordless telephone set, a session initiation protocol (SIP) phone, a wireless local loop (WLL) station, or a personal digital assistant (PDA). A common terminal device includes, for example, a mobile phone, a tablet, a notebook computer, a palmtop computer, a mobile internet device (MID), and a wearable device such as a smart watch, a smart band, or a pedometer. However, this is not limited in embodiments of the present disclosure. Alternatively, the terminal device in embodiments of the present disclosure may be a terminal device or the like that appears in a future evolved PLMN. This is not limited in embodiments of the present disclosure. A specific technology and a specific device form that are used by the terminal device are not limited in embodiments of the present disclosure.

In addition, the terminal device in embodiments of the present disclosure may alternatively be a terminal device in an IoT system. IoT is an important part of future development of information technologies. A main technical feature of the IoT is connecting a thing to a network by using a communication technology, to implement an intelligent network for interconnection between a person and a machine or between things. In embodiments of the present disclosure, an IoT technology may implement massive connections, deep coverage, and terminal power saving by using, for example, a narrow band (NB) technology.

In addition, in embodiments of the present disclosure, the terminal device may further include a sensor such as an intelligent printer, a train detector, or a gas station. Main functions of the terminal device include collecting data (for some terminal devices), receiving control information and downlink data from a network device, sending an electromagnetic wave, and transmitting uplink data to the network device.

The network device in embodiments of the present disclosure is an entity that is on a network side and that is configured to transmit or receive a signal. The network device in embodiments of the present disclosure may be a device in a wireless network, for example, a RAN node that enables the terminal to access the wireless network. For example, the network device may be an evolved NodeB (eNB or e-NodeB) in LTE, a new radio controller (NR controller), a gNodeB (gNB) in a 5G system, a centralized unit (CU), a new radio base station, a remote radio module, a micro base station, a relay, a distributed unit (DU), a home base station, a transmission reception point (TRP), a transmission point (TP), or any other wireless access device. This is not limited in embodiments of the present disclosure. The network device may cover one or more cells.

The access network device and the terminal device may be deployed on land, including indoor or outdoor devices, handheld devices, or vehicle-mounted devices: may be deployed on the water: or may be deployed on an airplane, a drone, a balloon, and a satellite in the air. Application scenarios of the access network device and the terminal device are not limited in embodiments of the present disclosure.

A network architecture and a service scenario that are described in embodiments of this application are intended to describe technical solutions in embodiments of the present disclosure more clearly, but constitute no limitation on the technical solutions provided in embodiments of the present disclosure. A person of ordinary skill in the art may know that, with evolution of the network architecture and emergence of new service scenarios, the technical solutions provided in embodiments of the present disclosure are also applicable to similar technical problems.

Figure 3:
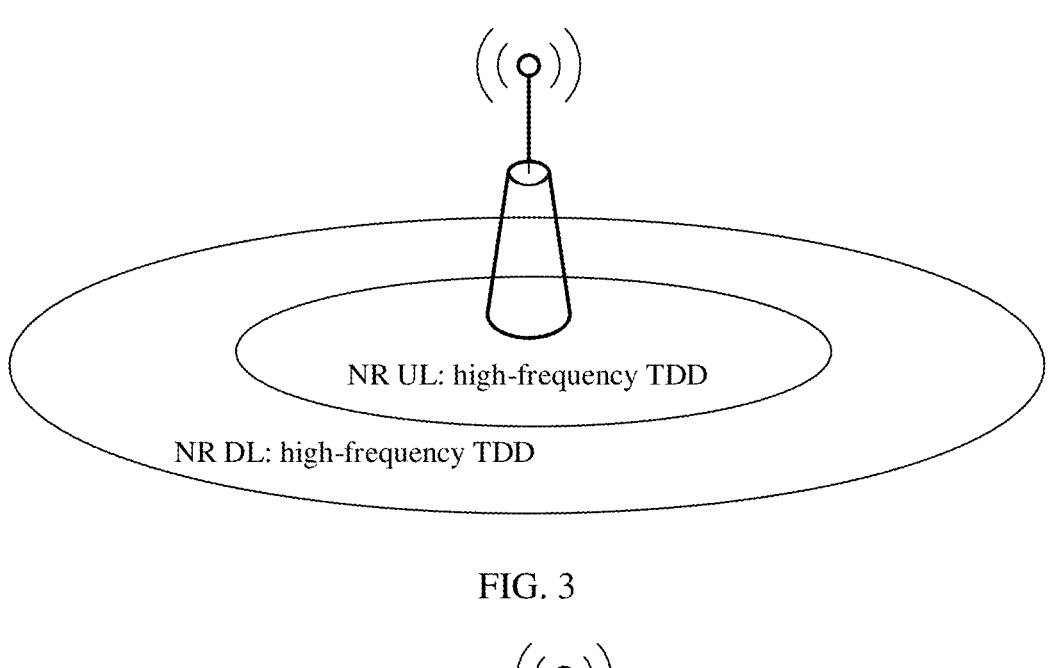
FIG. 3 is a schematic diagram of a carrier of an NR system according to an embodiment of the present disclosure.
Figure 4:
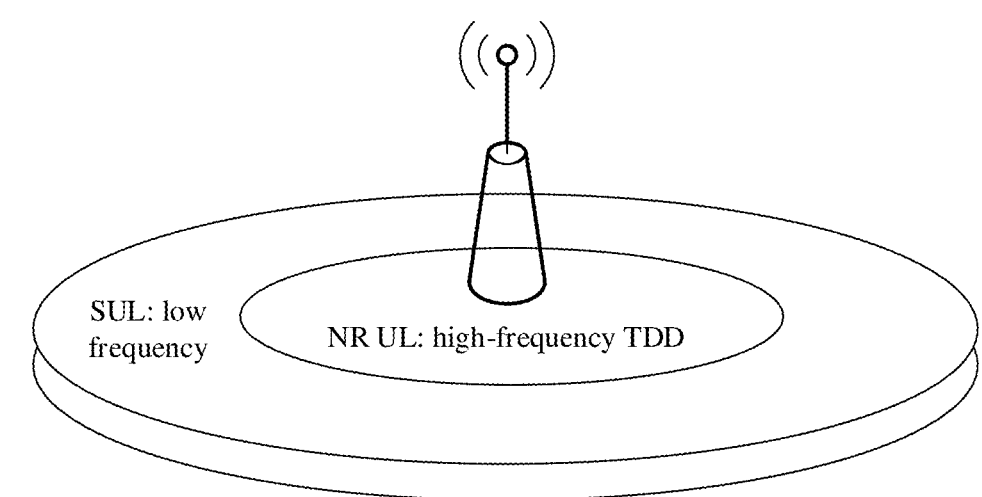
FIG. 4 is a schematic diagram of an SUL according to an embodiment of the present disclosure.
Figure 5:
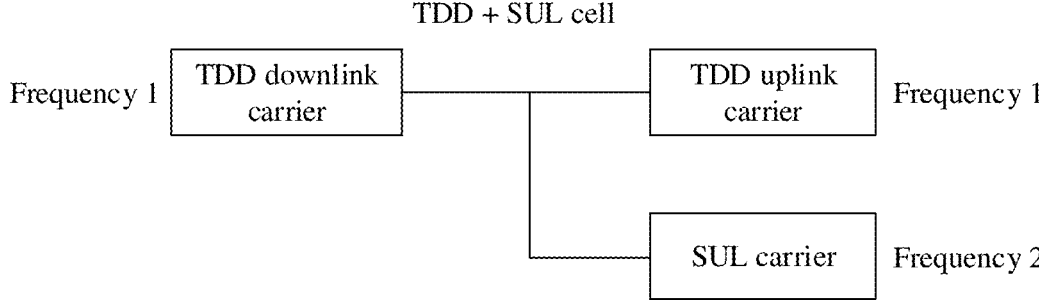
FIG. 5 is a schematic diagram of a cell type according to an embodiment of the present disclosure.

Compared with LTE, 5G NR has a higher working frequency and a higher penetration loss and a distance loss in uplink signal transmission. Uplink coverage of 5G NR is smaller than downlink coverage of 5G NR by about 14 dB. As shown in FIG. 3, a coverage area of an NR uplink (UL) is smaller than a coverage area of an NR downlink (DL). As a result, a cell edge user cannot access a cell by using an uplink, and consequently, a success rate of accessing the cell by the cell edge user is reduced. To enhance uplink coverage, a supplementary uplink (SUL) carrier is introduced into 5G NR. As shown in FIG. 4, an SUL carrier has a low frequency, and can supplement uplink coverage to some extent. In 5G NR, a cell type is defined for a combination of an SUL carrier and a time division duplex (TDD) carrier, including one downlink carrier and two uplink carriers, as shown in FIG. 5.

Figure 6:
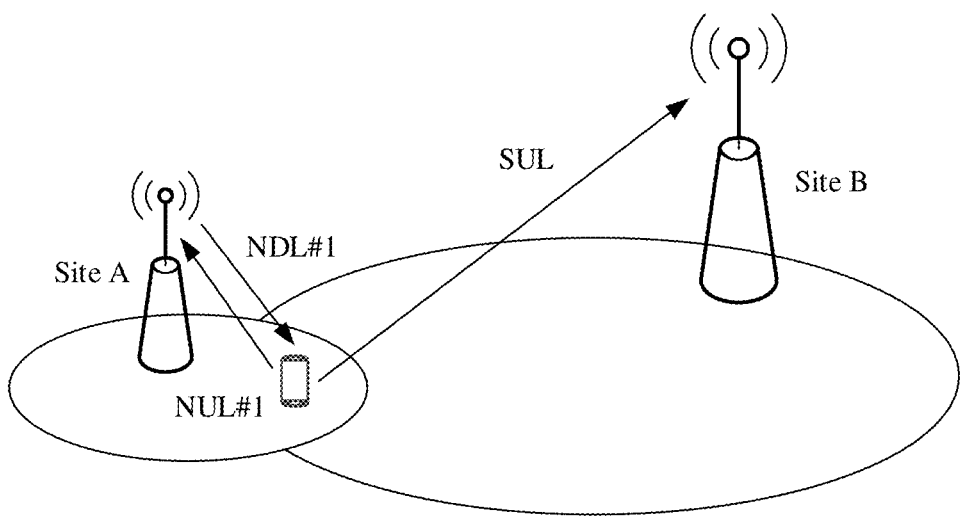
FIG. 6 is a schematic diagram of which an NUL carrier and an SUL carrier are deployed at different sites according to an embodiment of the present disclosure.

In future network deployment, an NUL carrier and an SUL carrier may be deployed at different sites to reduce costs. For example, as shown in FIG. 6, an NUL #1 carrier and an NDL #1 carrier are deployed at a site A, an NUL #2 carrier, an SUL carrier, and an NDL #2 carrier are deployed at a site B, and a coverage area of the SUL carrier at the site B is large, so that user equipment (UE) accessing the NUL #1 carrier can access the SUL carrier.

During uplink transmission, UE performs uplink power control based on a path loss of an uplink carrier, for example, calculates transmit power of uplink transmission or power headroom of the uplink carrier. In LTE, because a coverage area of an uplink carrier and a coverage area of a downlink carrier are approximately the same, UE can use, as a path loss compensation value for uplink power control, a downlink path loss estimation value obtained through calculation based on a path loss reference signal (for example, a physical uplink shared channel (PUSCH)-pathlossReferenceRS). The path loss reference signal may be determined in the following manners.

Manner 1: If the UE does not configure PUSCH-pathlossReferenceRS, or before the UE configures a parameter used to measure a path loss, the UE may calculate the downlink path loss estimation value by using a synchronization signal/physical broadcast channel block (SS/PBCH block, SSB), where the SSB is used to obtain a master information block (MIB).

Manner 2: If PUSCH transmission is scheduled by a random access response (RAR) UL grant, the UE may calculate the downlink path loss estimation value by using a same reference signal index as a reference signal index of a related physical random access channel (PRACH) transmission.

Manner 3: When a plurality of path loss reference signal identifiers (identifications, IDs) are configured, a base site may further configure an association relationship between the plurality of path loss reference signal IDs and different indication values of a sounding reference signal (SRS) resource indicator (SRI) field. The UE may determine, based on the SRI indication information, a reference signal used to determine a path loss estimation value of a current PUSCH. The path loss reference signal may be an SSB, a downlink channel state information reference signal (CSI-RS), or the like.

However, in a scenario in which the NUL carrier and the SUL carrier are deployed at different sites, the SUL carrier has no corresponding downlink carrier, and cannot obtain corresponding path loss information. For example, FIG. 6 is used as an example. The UE may access the NUL #1 carrier at the site A and the SUL carrier at the site B in uplink, and may access the NDL #1 carrier at the site A in downlink. Because the NUL #1 carrier and the SUL carrier correspond to different sites, and the SUL carrier has no corresponding downlink carrier, the UE cannot obtain a downlink reference signal, cannot obtain a downlink path loss value as an uplink path loss estimation value of the SUL carrier, and consequently cannot perform power control on the SUL carrier.

Based on this, embodiments of the present disclosure provide a communication method and an apparatus, to resolve a problem of how to determine an uplink transmit power when there is no uplink carrier corresponding to a downlink carrier. The method and the apparatus are based on a same inventive concept. Because the method and the apparatus have a similar problem-resolving principle, for implementations of the apparatus and the method, refer to each other, and no repeated description is provided.

It should be understood that, in embodiments of the present disclosure, "at least one" means one or more, and "a plurality of" means two or more. The term "and/or" describes an association relationship between associated objects, and indicates that three relationships may exist. For example, A and/or B may indicate one of the following cases: Only A exists, both A and B exist, and only B exists, where A and B may be singular or plural. The character "/" generally indicates an "or" relationship between the associated objects. "At least one of the following pieces (items)" or a similar expression thereof indicates any combination of these items, including a single item (piece) or any combination of a plurality of items (pieces). For example, at least one of a, b, or c may represent: a, b, c, a and b, a and c, b and c, or a, b, and c, where a, b, and c may be singular or plural.

In embodiments of the present disclosure, the SUL carrier may include but is not limited to the following three types.

Type 1: The SUL carrier may be defined as an SUL carrier specified in the R15 protocol, for example, an LTE frequency division duplex (frequency division dual, FDD) uplink carrier.

Type 2: TDD carrier.

Type 3: An uplink slot unit of a TDD carrier.

A possible spectrum combination of the NUL carrier and SUL carrier that are deployed at different sites may include but is not limited to the following five combinations.

Combination 1:6 GHz+2.1 GHZ/2.3 GHZ. The 6 GHz frequency band has a large bandwidth and a large downlink capacity. The NUL carrier and SUL carrier are deployed at different sites to improve uplink coverage and an uplink capacity.

Combination 2:2.6 GHz+6 GHz+sub 1 GHz. The 6 GHz is used to resolve a problem of outdoor coverage. The sub 1 GHz has a small bandwidth and large coverage, and is used to enhance indoor coverage/an indoor capacity.

Combination 3:2.6 GHz+4.9 GHZ. Both frequencies are TDD carriers. The low frequency 2.6 GHz can be used as an NUL. The 4.9 GHz frequency band uses only uplink resources. A 2.6 GHz uplink can assist a 4.9 GHz uplink.

Combination 4:2.6 GHz+28 GHz. Uplink slots of NUL and SUL frequency bands are supplementary. The low frequency band is a primary site, and the high frequency band is a supplementary site. DL frequencies of the two frequency bands differ greatly, and a path loss is inaccurate. The NUL carrier and SUL carrier are deployed at different sites to improve a capacity.

Combination 5:2.6 GHz+1.9 GHZ/2.0 GHz. LTE is a mainstream spectrum, and an uplink carrier shares a spectrum with NR through dynamic spectrum sharing (DSS).

In addition, it should be understood that in descriptions of the present disclosure, terms such as "first" and "second" are merely intended for purposes of description, and should not be understood as an indication or implication of relative importance, cannot be understood as an indication or implication of a sequence, and cannot represent a quantity.

The following describes in detail the method provided in embodiments of the present disclosure with reference to the accompanying drawings. The method provided in embodiments of the present disclosure may be applied to a scenario shown in FIG. 6. UE may determine, by using the method provided in embodiments of the present disclosure, uplink transmit power or power headroom for an uplink carrier that has no corresponding downlink carrier.

Figure 7:
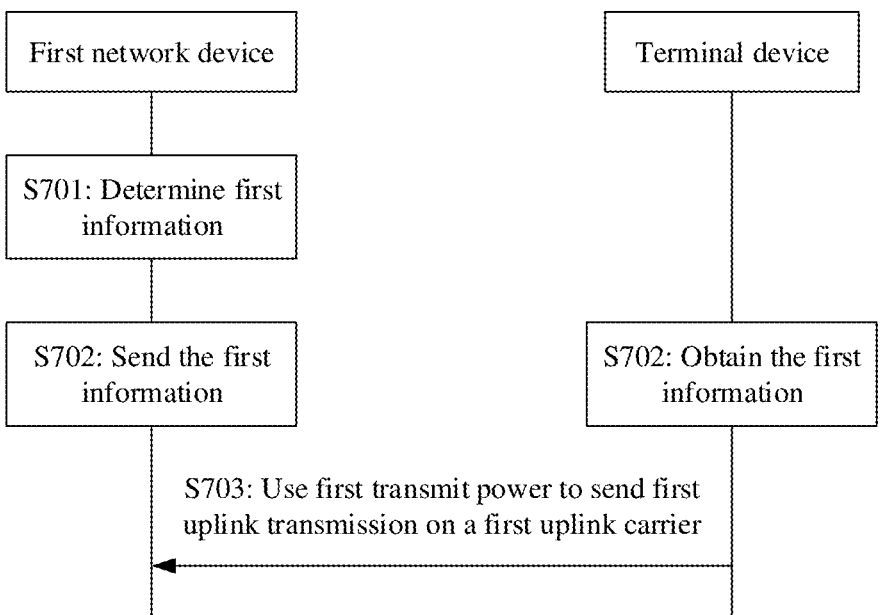
FIG. 7 is a schematic flowchart of a communication method according to an embodiment of the present disclosure.

Embodiment 1: FIG. 7 is a schematic flowchart of a communication method according to the present disclosure. The method includes the following steps.

S701: A first network device determines first information, where the first information may be a path loss value of a first uplink carrier, or the first information may be a power offset value, and the first information is used to determine transmit power of first uplink transmission on the first uplink carrier.

For example, the first uplink carrier may be an SUL carrier of a second uplink carrier, the first network device may be a network device at which the first uplink carrier is deployed, and a second network device may be a network device at which the second uplink carrier is deployed. For example, as shown in FIG. 6, the first uplink carrier may be an SUL carrier, the second uplink carrier may be an NUL #1 carrier, the first network device may be a site B, and the second network device may be a site A.

A serving cell in which the first uplink carrier is located and a serving cell in which the second uplink carrier is located may be a same serving cell. Alternatively, the first uplink carrier and the second uplink carrier may be configured by using a system information block 1 (SIB1).

The first uplink transmission may be but is not limited to a PRACH, an SRS, a physical uplink control channel (PUCCH), or a PUSCH used to transmit data or a message 3 (msg3).

In some embodiments, that the first network device determines the first information may be implemented in the following manner. The terminal device sends second uplink transmission to the first network device on the first uplink carrier. The first network device determines the first information based on the second uplink transmission.

For example, the second uplink transmission may be but is not limited to the PRACH, the msg3, the PUSCH, or the SRS.

In an implementation, the first network device may further receive transmit power information of the second uplink transmission. When determining the first information based on the second uplink transmission, the first network device may determine the first information based on the transmit power information and a measurement value of the second uplink transmission. The transmit power information of the second uplink transmission may be sent by the terminal device, or transmit power of the second uplink transmission may be preconfigured by a network device. For example, the transmit power of the second uplink transmission may alternatively be preconfigured by the first network device. For another example, the transmit power of the second uplink transmission may alternatively be preconfigured by the second network device, and is sent by the second network device to the first network device.

The measurement value of the second uplink transmission may be determined based on reference signal received power (RSRP), a received signal strength indicator (RSSI), reference signal received quality (RSRQ), or a signal to interference plus noise ratio (SINR).

The RSRP is a linear value (power on each resource element (RE)) of power within a cell downlink reference signal measurement bandwidth, and is used to reflect path loss strength of a current channel.

The RSSI is total received power on all REs on an orthogonal frequency division multiplexing (OFDM) symbol within a UE sounding bandwidth. The total received power includes a serving cell signal and a non-serving cell signal, adjacent-channel interference, and thermal noise inside a system, and is used to reflect received signal strength and an interference degree of a current channel.

RSRQ=M*RSRP/RSSI, where M is a quantity of resource blocks (RBs) within an RSSI-based measurement bandwidth, in other words, a total quantity of RBs in a system bandwidth. A user reflects and indicates a signal-to-noise ratio and an interference level of current channel quality.

The SINR is a ratio of reference signal power to interference noise power within a UE sounding bandwidth, and is used to reflect link quality of a current channel.

For example, the first network device may obtain a path loss value PL #1 or a power offset value delta #1 of the first uplink carrier by performing subtraction on the transmit power of the second uplink transmission and power RSRP of the second uplink transmission received by the first network device.

In a possible implementation, the terminal device may perform uplink handover. For example, before sending the second uplink transmission to the first network device on the first uplink carrier, the terminal device may send third uplink transmission, and the third uplink transmission is sent to the second network device on the second uplink carrier. The third uplink transmission may be uplink transmission previous to the second uplink transmission, and the second uplink transmission may be the $1^{st}$ uplink transmission sent by the terminal device on the first uplink carrier after uplink handover.

S702: The first network device sends the first information. Correspondingly, the terminal device obtains the first information.

In an implementation, the first network device may send the first information to the second network device, and the second network device sends the first information to the terminal device by using a downlink carrier. For example, in the communication system shown in FIG. 6, the site B may send the first information to the site A, and the site A sends the first information to the terminal device by using a downlink carrier NDL #1.

Optionally, the first information may be carried in downlink control information, where the downlink control information may be UE-specific DCI, for example, uplink scheduling signaling, including DCI formats 0_1 and 0_2, and uplink scheduling signaling in another format; or the downlink control information may be common DCI, where the common DCI may indicate uplink path loss values of a plurality of serving cells, a plurality of carriers, or a plurality of terminal devices.

Optionally, the first information may alternatively be carried in a media access control (MAC) control element (MAC control element, MAC CE). Alternatively, the first information is carried in radio resource control (RRC) signaling.

S703: The terminal device uses the first transmit power to send the first uplink transmission on the first uplink carrier.

For example, the first transmit power may be determined by using a target power value, the path loss value, a path loss compensation factor, a quantity of transmission resource blocks, a modulation and coding scheme, and a closed-loop power control parameter, and the path loss value is the path loss value of the first uplink carrier.

For example, the first transmit power may satisfy the following formula. Alternatively, it may be understood as that the first transmit power may be determined by using the following formula:

$$P_{PUSCH,b,f,c}(i, j, q_d, l) = P_{O\_PUSCH,b,f,c}(j) +$$

$$10\log_{10}\left(2^{\mu} \cdot M_{RB,b,f,c}^{PUSCH}(i)\right) + \alpha_{b,f,c}(j) \cdot PL_{b,f,c}(q_d) + \Delta_{TF,b,f,c}(i) + f_{b,f,c}(i, l).$$

$PL_{b,f,c}$ $(q_d)$ is the path loss value of the first uplink carrier received by the terminal device, $P_{O\_PUSCH,b,f,c}(j)$ and $\alpha_{b,f,c}(j)$ are open-loop power control parameters, $P_{O\_PUSCH,b,f,c}(j)$ is the target power value, $\alpha_{b,f,c}(j)$ is the path loss compensation factor, a value of $\alpha^{b,f,c}(j)$ is (0, 1], and $j \in \{0,1, \ldots, J-1\}$. When the first network device configures a plurality of parameter sets of indications $P_{O\_PUSCH,b,f,c}(j)$ and values of $\alpha_{b,f,c}(j)$, the terminal device may determine, based on a transmission mode of the first uplink transmission (for example, initial access transmission, data transmission based on a configuration grant, data scheduling transmission based on downlink control information (DCI), and RRC-based data scheduling transmission), a number j of a parameter set used by the first uplink transmission, and therefore $P_{O\_PUSCH,b,f,c}(j)$ and the value of $\alpha p_{b,f,c}(j)$ are determined. A parameter in a parameter set includes an ID of the set, $P_{O\_PUSCH,b,f,c}(j)$, and the value of $\alpha_{b,f,c}(j)$. When the first network device configures a plurality of parameter sets and DCI for scheduling a PUSCH includes an SRI field, the terminal device may determine, based on a mapping relationship between SRI indication information and the plurality of parameter sets, a parameter set used to actually send the first uplink transmission. The mapping relationship may alternatively be configured by using RRC.

$$M_{RB,b,f,c}^{PUSCH}(i)$$

is the quantity of transmission resource blocks, to be specific, a quantity of RBs occupied by the first uplink transmission at a sending occasion i on an uplink active bandwidth part b of a carrier f of a serving cell C of the first network device.

μ is the path loss compensation factor, and μ is a value corresponding to subcarrier spacing (SCS) configuration. A correspondence between μ and SCS configuration when $\Delta f=2_\mu \cdot 15$ [kHz] may be shown in Table 1.

TABLE 1

| μ | SCS |
|---|-----|
| 0 | 15 |
| 1 | 30 |
| 2 | 60 |
| 3 | 120 |
| 4 | 240 |

$\Delta_{IF,b,f,c}(i)$ is determined based on the modulation and coding scheme, and $\Delta_{IF,b,f,c}(i)$ is determined based on factors such as a type of information carried in the first uplink transmission (for example, data information of a UL-shared channel (SCH) or channel state information (CSI) is carried), a location of an occupied physical resource, and a quantity of occupied physical resources.

$f_{b,f,c}(i,l)$ is the closed-loop power control parameter. To be specific, a first uplink transmit power control adjustment state at the transmission occasion i on the uplink active bandwidth part b of the carrier f of the serving cell c of the first network device. The information may be notified, to the terminal device, by the first network device by delivering DCI signaling, so that the first network device can adjust transmit power of uplink transmission in real time based on a current transmission channel status and a scheduling status.

In a possible implementation, after sending the first uplink transmission, the terminal device may determine transmit power of uplink transmission on the first uplink carrier within a period of time based on the first information received in step S702. For example, after receiving the path loss value of the first uplink carrier, the terminal device may determine second transmit power of fourth uplink transmission on the first uplink carrier based on the path loss value, and use the second transmit power to send the fourth uplink transmission on the first uplink carrier. A time interval between a receiving moment of the path loss value and a sending moment of the fourth uplink transmission does not exceed a preset threshold. Alternatively, a time interval between a receiving moment of the fourth uplink transmission and a sending moment of the fourth uplink transmission does not exceed a preset threshold. The preset threshold may be predefined, and is agreed upon by the network device and the terminal device. Alternatively, the preset value may be configured by using a high layer parameter. Alternatively, the preset value may be activated by the MAC CE. Alternatively, the preset value may be indicated by the downlink control information (DCI).

Figure 8:
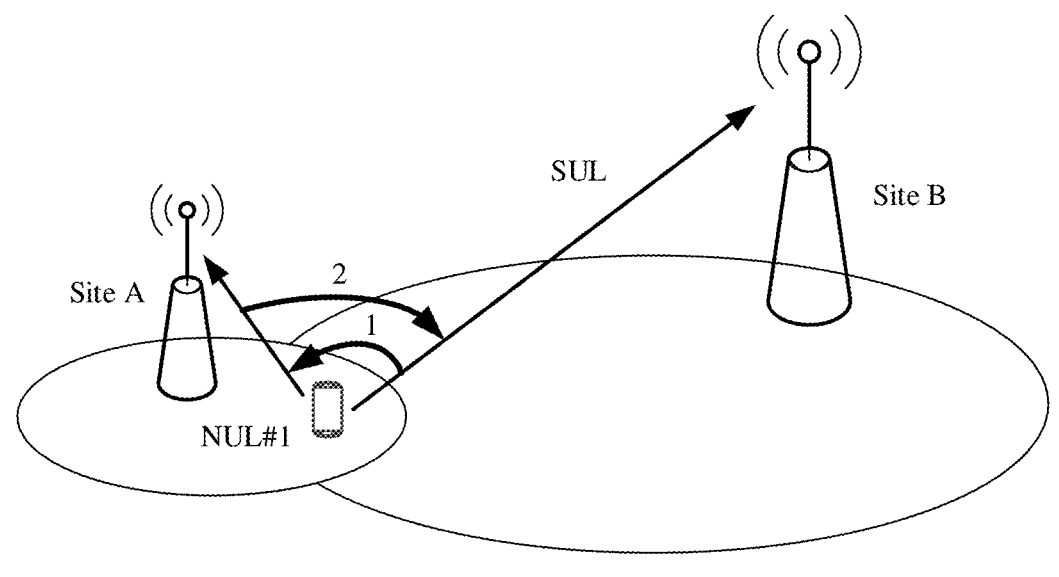
FIG. 8 is a schematic diagram of uplink handover according to an embodiment of the present disclosure.

In another possible implementation, after sending the first uplink transmission, the terminal device may perform handover to the second uplink carrier for uplink transmission. After performing handover from the second uplink carrier to the first uplink carrier again, the terminal device may determine, based on the first information received in step S702, transmit power of the $1^{st}$ uplink transmission after the terminal device performs handover to the first uplink carrier again, as shown in FIG. 8.

For example, after sending the first uplink transmission on the first uplink carrier, the terminal device sends uplink transmission on the second uplink carrier. The first uplink transmission is the last uplink transmission sent on the first uplink carrier before the terminal device sends the uplink transmission on the second uplink carrier. Before sending uplink transmission on the second uplink carrier, the terminal device may store the first information. After sending the uplink transmission on the second uplink carrier, the terminal device sends the uplink transmission on the first uplink carrier, where transmit power of the uplink transmission is determined based on the first information.

To better understand the communication method provided in embodiments of the present disclosure, the following provides descriptions with reference to a scenario shown in FIG. 6. A site B shown in FIG. 6 is a first network device, a site A is a second network device, an SUL carrier at the site B is a first uplink carrier, and an NUL #1 carrier at the site A is a second uplink carrier.

Figure 9:
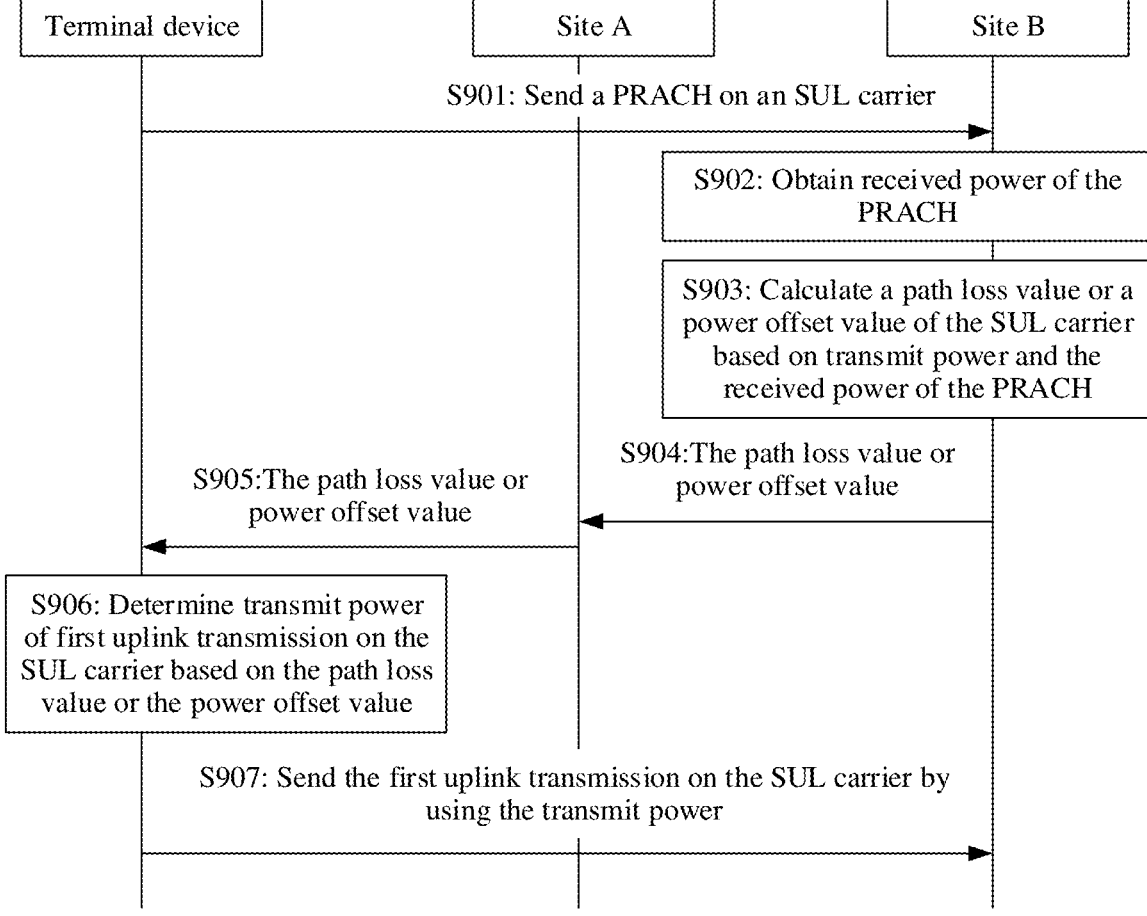
FIG. 9 is a schematic diagram of a power control process according to an embodiment of the present disclosure.

Example 1: In an example in which second uplink transmission is a PRACH, as shown in FIG. 9, a power control process may be as follows.

S901: A terminal device sends a PRACH on an SUL carrier, where transmit power of the PRACH may be configured by a site B.

In an implementation, the terminal device may obtain configuration information of the transmit power of the PRACH, and send the PRACH on the SUL carrier based on the configuration information.

Optionally, the PRACH may be the $1^{st}$ uplink transmission sent by UE to the site B on the SUL carrier.

S902: After receiving the PRACH, the site B obtains received power of the PRACH.

S903: The site B calculates a path loss value PL #1 of the SUL carrier based on the transmit power and the received power of the PRACH. Alternatively, the site B determines a power offset value delta #1 based on the transmit power and the received power of the PRACH.

S904: The site B sends the PL #1 or the delta #1 to a site A.

S905: The site A sends the PL #1 or the delta #1 to the UE by using a downlink carrier NDL #1.

Optionally, the PL #1 or the delta #1 may be carried in downlink control information, where the downlink control information may be UE-specific DCI, for example, uplink scheduling signaling, including DCI formats 0_1 and 0_2, and uplink scheduling signaling in another format; or the downlink control information may be common DCI, where the common DCI may indicate uplink path loss values of a plurality of serving cells, a plurality of carriers, or a plurality of terminal devices.

Optionally, the PL #1 or the delta #1 may alternatively be carried on a MAC CE. Alternatively, the first information is carried in RRC signaling.

S906: The terminal device determines transmit power of first uplink transmission on the SUL carrier based on the PL #1 or the delta #1.

The first uplink transmission may be a PRACH, an SRS, a PUCCH, a PUSCH used to transmit data or a msg3, or the like.

S907: The terminal device sends the first uplink transmission on the SUL carrier by using the transmit power.

Figure 10:
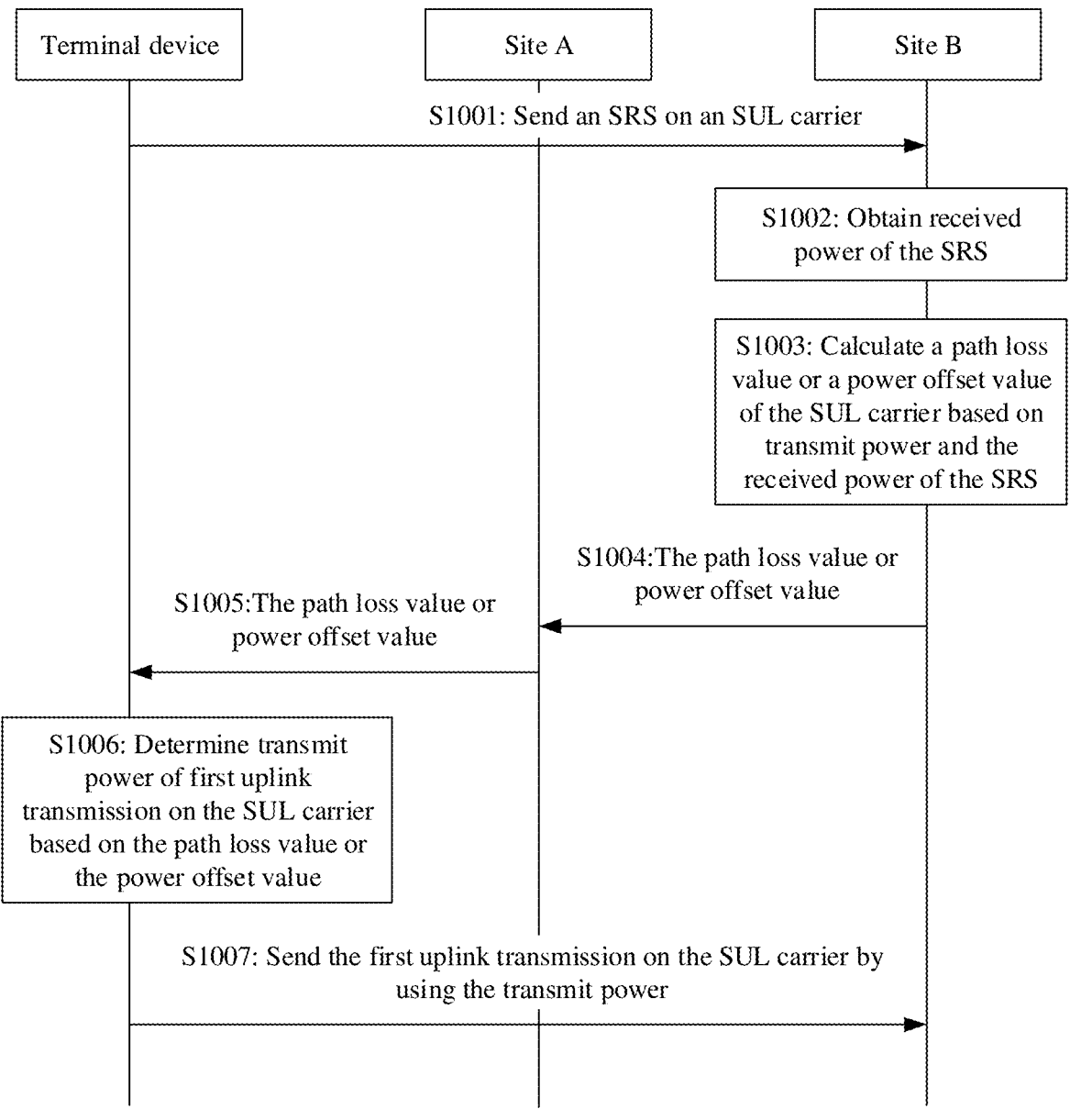
FIG. 10 is a schematic diagram of another power control process according to an embodiment of the present disclosure.

Example 2: In an example in which second uplink transmission is an SRS, as shown in FIG. 10, a power control process may be as follows.

S1001: A terminal device sends an SRS on an SUL carrier.

In an implementation, the terminal device may obtain configuration information of transmit power of the SRS, and send the SRS on the SUL carrier based on the configuration information.

Optionally, the SRS may be the $1^{st}$ uplink transmission sent by UE to a site B on the SUL carrier.

For example, the SRS may be a wideband SRS. The wideband SRS occupies a large quantity of RBs in frequency domain, and transmit power is high.

S1002: After receiving the SRS, the site B obtains received power of the SRS.

S1003: The site B calculates a path loss value PL #1 of the SUL carrier based on the transmit power and the received power of the SRS. Alternatively, the site B determines a power offset value delta #1 based on the transmit power and the received power of the SRS.

The transmit power of the SRS may be configured by the site B, or the transmit power of the SRS may be reported by the terminal device to the site B. In an implementation, the terminal device sends the SRS on the SUL carrier, and sends transmit power information of the SRS on the SUL carrier.

S1004: The site B sends the PL #1 or the delta #1 to a site A.

S1005: The site A sends the PL #1 or the delta #1 to the UE by using a downlink carrier NDL #1.

Optionally, the PL #1 or the delta #1 may be carried in downlink control information, where the downlink control information may be UE-specific DCI, for example, uplink scheduling signaling, including DCI formats 0_1 and 0_2, and uplink scheduling signaling in another format; or the downlink control information may be common DCI, where the common DCI may indicate uplink path loss values of a plurality of serving cells, a plurality of carriers, or a plurality of terminal devices.

Optionally, the PL #1 or the delta #1 may alternatively be carried on a MAC CE. Alternatively, the first information is carried in RRC signaling.

S1006: The terminal device determines transmit power of first uplink transmission on the SUL carrier based on the PL #1 or the delta #1.

The first uplink transmission may be a PRACH, an SRS, a PUCCH, a PUSCH used to transmit data or a msg3, or the like.

S1007: The terminal device sends the first uplink transmission on the SUL carrier by using the transmit power.

In Embodiment 1 of the present disclosure, the first network device determines an uplink path loss value or an uplink power offset value, and notifies the uplink path loss value or the uplink power offset value to the terminal device, so that the terminal device can determine transmit power of other uplink transmission by using the path loss value or the power offset value notified by the first network device, and can obtain uplink transmit power for an uplink carrier that has no corresponding downlink carrier.

When the method provided in the present disclosure is applied to a scenario in which an NUL carrier and an SUL carrier are deployed at different sites, UL service interruption caused by a UL handover failure can be reduced, a quantity of SUL sites to be deployed can be reduced, a UL transmission delay can be reduced, an uplink capacity can be improved, and mobility can be better supported.

Figure 11:
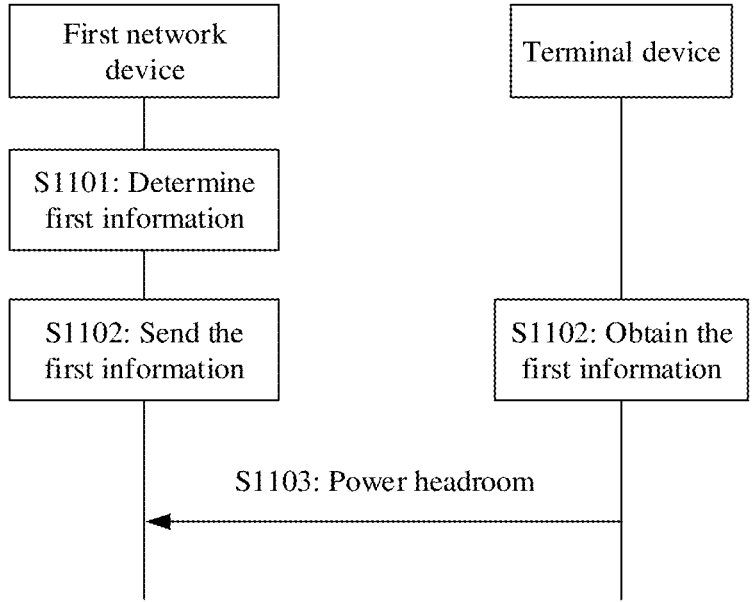
FIG. 11 is a schematic flowchart of a communication method according to an embodiment of the present disclosure.

Embodiment 2: FIG. 11 is a schematic flowchart of a communication method according to the present disclosure. The method includes the following steps.

S1101: A first network device determines first information, where the first information may be a path loss value of a first uplink carrier, or the first information may be a power offset value, and the first information is used to determine power headroom of fifth uplink transmission on the first uplink carrier.

For example, the first uplink carrier may be an SUL carrier of a second uplink carrier, the first network device may be a network device at which the first uplink carrier is deployed, and a second network device may be a network device at which the second uplink carrier is deployed. For example, as shown in FIG. 6, the first uplink carrier may be an SUL carrier, the second uplink carrier may be an NUL #1 carrier, the first network device may be a site B, and the second network device may be a site A.

A serving cell in which the first uplink carrier is located and a serving cell in which the second uplink carrier is located may be a same serving cell. Alternatively, the first uplink carrier and the second uplink carrier may be configured by using a SIB1.

The fifth uplink transmission may be but is not limited to a PRACH, an SRS, a PUCCH, or a PUSCH used to transmit data or a message 3 (msg3).

In some embodiments, that the first network device determines the first information may be implemented in the following manner. The terminal device sends sixth uplink transmission to the first network device on the first uplink carrier. The first network device determines the first information based on the sixth uplink transmission.

For example, the sixth uplink transmission may be but is not limited to the PRACH, the msg3, the PUSCH, or the SRS.

In an implementation, the first network device may further receive transmit power information of the sixth uplink transmission. When determining the first information based on the second uplink transmission, the first network device may determine the first information based on the transmit power information and a measurement value of the sixth uplink transmission. The transmit power information of the sixth uplink transmission may be sent by the terminal device, or transmit power of the sixth uplink transmission may be preconfigured by a network device. For example, the transmit power of the sixth uplink transmission may alternatively be preconfigured by the first network device. For another example, the transmit power of the sixth uplink transmission may alternatively be preconfigured by the second network device, and is sent by the second network device to the first network device.

The measurement value of the sixth uplink transmission may be determined based on RSRP, an RSSI, RSRQ, or an SINR.

The RSRP is a linear value (power on each RE) of power within a cell downlink reference signal measurement bandwidth, and is used to reflect path loss strength of a current channel.

RSSI is total received power on all REs on an OFDM symbol within a UE sounding bandwidth. The total received power includes a serving cell signal and a non-serving cell signal, adjacent-channel interference, and thermal noise inside a system, and is used to reflect received signal strength and an interference degree of a current channel.

RSRQ=M*RSRP/RSSI, where M is a quantity of RBs within an RSSI-based measurement bandwidth, in other words, a total quantity of RBs in a system bandwidth. A user reflect and indicate a signal-to-noise ratio and an interference level of current channel quality.

The SINR is a ratio of reference signal power to interference noise power within a UE sounding bandwidth, and is used to reflect link quality of a current channel.

For example, the first network device may obtain a path loss value PL #1 or a power offset value delta #1 of the first uplink carrier by performing subtraction on the transmit power of the sixth uplink transmission and power RSRP of the sixth uplink transmission received by the first network device.

In a possible implementation, the terminal device may perform uplink handover. For example, before sending the sixth uplink transmission to the first network device on the first uplink carrier, the terminal device may send seventh uplink transmission, and the seventh uplink transmission is sent to the second network device on the second uplink carrier. The seventh uplink transmission may be uplink transmission previous to the sixth uplink transmission, and the sixth uplink transmission may be the $1^{st}$ uplink transmission sent by the terminal device on the first uplink carrier after uplink handover.

S1102: The first network device sends the first information. Correspondingly, the terminal device obtains the first information.

In an implementation, the first network device may send the first information to the second network device, and the second network device sends the first information to the terminal device by using a downlink carrier. For example, in the communication system shown in FIG. 6, the site B may send the first information to the site A, and the site A sends the first information to the terminal device by using a downlink carrier NDL #1.

Optionally, the first information may be carried in downlink control information, where the downlink control information may be UE-specific DCI, for example, uplink scheduling signaling, including DCI formats 0_1 and 0_2, and uplink scheduling signaling in another format; or the downlink control information may be common DCI, where the common DCI may indicate uplink path loss values of a plurality of serving cells, a plurality of carriers, or a plurality of terminal devices.

Optionally, the first information may alternatively be carried on a MAC CE. Alternatively, the first information is carried in RRC signaling.

S1103: The terminal device sends power headroom to the first network device.

For example, the power headroom is determined by using a maximum transmit power value, a target power value, the path loss value, a path loss compensation factor, a quantity of transmission resource blocks, a modulation and coding scheme, and a closed-loop power control parameter, and the path loss value is the path loss value of the first uplink carrier.

For example, the power headroom may satisfy the following formula. Alternatively, it may be understood as that the power headroom may be determined by using the following formula:

$$PH_{type1,b,f,c}(i, j, q_d, l) =$$
$$P_{CMAX,f,c}(i) - \{P_{O\_PUSCH,b,f,c}(j) + 10\log_{10}(2^{\mu} \cdot M_{RB,b,f,c}^{PUSCH}(i)) +$$
$$\alpha_{b,f,c}(j) \cdot PL_{b,f,c}(q_d) + \Delta_{TF,b,f,c}(i) + f_{b,f,c}(i, l)\}.$$

$PL_{b,f,c}$ $(q_d)$ is a path loss value of the first uplink carrier received by the terminal device. For details about $P_{O\_PUSCH,b,f,c}(j)$, $\alpha_{b,f,c}(j)$, $$M_{RB,b,f,c}^{PUSCH}(i),$$

$\mu$, $\Delta_{TF,b,f,c}(i)$, and $f_{b,f,c}(i,l)$, refer to related descriptions of $P_{O\_PUSCH,b,f,c}(j)$, $\alpha_{b,f,c}(j)$, $$M_{RB,b,f,c}^{PUSCH}(i),$$

$\mu$, $\Delta_{TF,b,f,c}(i)$, and $f_{b,f,c}(i,l)$ in the foregoing Embodiment 1. Details are not described herein again.

For another example, the power headroom may alternatively satisfy the following formula. Alternatively, it may be understood as that the power headroom may be determined by using the following formula:

$$PH_{type1,b,f,c}(i, j, q_d, l) =$$
$$P_{CMAX,f,c}(i) - \{P_{O\_PUSCH,b,f,c}(j) + 10\log_{10}(2^{\mu} \cdot M_{RB,b,f,c}^{PUSCH}(i)) +$$
$$\alpha_{b,f,c}(j) \cdot PL_{b,f,c}(q_d) + \Delta_{TF,b,f,c}(i) + f_{b,f,c}(i, l)\} + delta\#1.$$

$PL_{b,f,c}$ $(q_d)$ is a path loss value of the second uplink carrier, and delta #1 is a power offset value received by the terminal device. For details about $P_{O\_PUSCH,b,f,c}(j)$, $\alpha_{b,f,c}(j)$, $$M_{RB,b,f,c}^{PUSCH}(i),$$

$\mu$, $\Delta_{TF,b,f,c}(i)$, and $f_{b,f,c}(i,l)$, refer to related descriptions of $P_{O\_PUSCH,b,f,c}(j)$, $\alpha_{b,f,c}(j)$, $$M_{RB,b,f,c}^{PUSCH}(i),$$

$\mu$, $\Delta_{TF,b,f,c}(i)$, and $f_{b,f,c}(i,l)$ in the foregoing Embodiment 1. Details are not described herein again.

To better understand the communication method provided in embodiments of the present disclosure, the following provides descriptions with reference to a scenario shown in FIG. 6. A site B shown in FIG. 6 is a first network device, a site A is a second network device, an SUL carrier at the site B is a first uplink carrier, and an NUL #1 carrier at the site A is a second uplink carrier.

Example 3: In an example in which second uplink transmission is a PRACH, a power control process may be as follows.

A1: A terminal device sends a PRACH on an SUL carrier, where transmit power of the PRACH may be configured by a site B.

In an implementation, the terminal device may receive configuration information of the transmit power of the PRACH, and send the PRACH on the SUL carrier based on the configuration information.

Optionally, the PRACH may be the $1^{st}$ uplink transmission sent by UE to the site B on the SUL carrier.

A2: After receiving the PRACH, the site B obtains received power of the PRACH.

A3: The site B calculates a path loss value PL #1 of the SUL carrier based on the transmit power and the received power of the PRACH. Alternatively, the site B determines a power offset value delta #1 based on the transmit power and the received power of the PRACH.

A4: The site B sends the PL #1 or the delta #1 to a site A.

A5: The site A sends the PL #1 or the delta #1 to the UE by using a downlink carrier NDL #1.

Optionally, the PL #1 or the delta #1 may be carried in downlink control information, where the downlink control information may be UE-specific DCI, for example, uplink scheduling signaling, including DCI formats 0_1 and 0_2, and uplink scheduling signaling in another format; or the downlink control information may be common DCI, where the common DCI may indicate uplink path loss values of a plurality of serving cells, a plurality of carriers, or a plurality of terminal devices.

Optionally, the PL #1 or the delta #1 may alternatively be carried on a MAC CE. Alternatively, the first information is carried in RRC signaling.

A6: The terminal device determines power headroom of fifth uplink transmission on the SUL carrier based on the PL #1 or the delta #1.

A7: The terminal device sends the power headroom to site B.

Example 4: In an example in which second uplink transmission is an SRS, a power control process may be as follows.

B1: A terminal device sends an SRS on an SUL carrier.

In an implementation, the terminal device may receive configuration information of transmit power of the SRS, and send the SRS on the SUL carrier based on the configuration information.

Optionally, the SRS may be the $1^{st}$ uplink transmission sent by UE to a site B on the SUL carrier.

For example, the SRS may be a wideband SRS. The wideband SRS occupies a large quantity of RBs in frequency domain, and transmit power is high.

B2: After receiving the SRS, the site B obtains received power of the SRS.

B3: The site B calculates a path loss value PL #1 of the SUL carrier based on the transmit power and the received power of the SRS. Alternatively, the site B determines a power offset value delta #1 based on the transmit power and the received power of the SRS.

The transmit power of the SRS may be configured by the site B, or the transmit power of the SRS may be reported by the terminal device to the site B. In an implementation, the terminal device sends the SRS on the SUL carrier, and sends transmit power information of the SRS on the SUL carrier.

B4: The site B sends the PL #1 or the delta #1 to a site A.

B5: The site A sends the PL #1 or the delta #1 to the UE by using a downlink carrier NDL #1.

Optionally, the PL #1 or the delta #1 may be carried in downlink control information, where the downlink control information may be UE-specific DCI, for example, uplink scheduling signaling, including DCI formats 0_1 and 0_2, and uplink scheduling signaling in another format; or the downlink control information may be common DCI, where the common DCI may indicate uplink path loss values of a plurality of serving cells, a plurality of carriers, or a plurality of terminal devices.

Optionally, the PL #1 or the delta #1 may alternatively be carried on a MAC CE. Alternatively, the first information is carried in RRC signaling.

B6: The terminal device determines power headroom of fifth uplink transmission on the SUL carrier based on the PL #1 or the delta #1.

B7: The terminal device sends the power headroom to the site B.

In Embodiment 2 of the present disclosure, the first network device determines an uplink path loss value or an uplink power offset value, and notifies the uplink path loss value or the uplink power offset value to the terminal device, so that the terminal device can determine the power headroom by using the path loss value or the power offset value notified by the first network device, and can obtain power headroom for an uplink carrier that has no corresponding downlink carrier.

Figure 12:
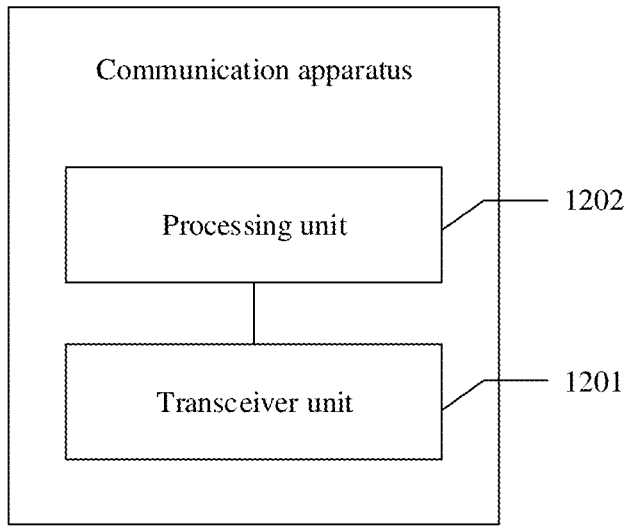
FIG. 12 is a schematic diagram of a structure of a communication apparatus according to an embodiment of the present disclosure.

Based on a same inventive concept as the method embodiments, an embodiment of the present disclosure provides a communication apparatus. A structure of the communication apparatus may be shown in FIG. 12. The communication apparatus includes a transceiver unit 1201 and a processing unit 1202.

In a specific implementation, the communication apparatus may be specifically configured to implement the method performed by the terminal device in embodiment shown in FIG. 7 to FIG. 10. The apparatus may be the terminal device, or may be a chip, a chip set, or a part of a chip, where the chip and the chip set are in the terminal device, and the part of the chip is configured to perform a function of a related method. The transceiver unit 1201 is configured to receive and send information. The processing unit 1202 is configured to: obtain a path loss value of a first uplink carrier, where the path loss value is used to determine first transmit power of first uplink transmission on the first uplink carrier; and use the first transmit power to send the first uplink transmission on the first uplink carrier by using the transceiver unit 1201.

For example, the first transmit power is determined by using a target power value, the path loss value, a path loss compensation factor, a quantity of transmission resource blocks, a modulation and coding scheme, and a closed-loop power control parameter, and the path loss value is the path loss value of the first uplink carrier.

Optionally, the transceiver unit 1201 is further configured to send second uplink transmission to a first network device on the first uplink carrier, where the path loss value is related to the second uplink transmission.

Optionally, the transceiver unit 1201 is further configured to send transmit power information of the second uplink transmission, where the path loss value is related to transmit power of the second uplink transmission.

For example, the first uplink carrier is an SUL carrier of a second uplink carrier.

For example, a serving cell in which the first uplink carrier is located and a serving cell in which the second uplink carrier is located are a same serving cell: or the first uplink carrier and the second uplink carrier are configured by using an SIB1.

Optionally, the processing unit 1202 is further configured to: after receiving the path loss value of the first uplink carrier by using the transceiver unit 1201, determine second transmit power of fourth uplink transmission on the first uplink carrier based on the path loss value; and use the second transmit power to send the fourth uplink transmission on the first uplink carrier by using the transceiver unit 1201, where a time interval between a receiving moment of the path loss value and a sending moment of the fourth uplink transmission does not exceed a preset threshold.

In a specific implementation, the communication apparatus may be specifically configured to implement the method performed by the terminal device in the embodiment in FIG. 11. The apparatus may be the terminal device, or may be a chip, a chip set, or a part of a chip, where the chip and the chip set are in the terminal device, and the part of the chip is configured to perform a function of a related method. The transceiver unit 1201 is configured to receive and send information. The processing unit 1202 is configured to: obtain a path loss value of a first uplink carrier, where the path loss value is used to determine power headroom of fifth uplink transmission on the first uplink carrier; and send the power headroom to a first network device by using the transceiver unit 1201.

For example, the power headroom is determined by using a maximum transmit power value, a target power value, the path loss value, a path loss compensation factor, a quantity of transmission resource blocks, a modulation and coding scheme, and a closed-loop power control parameter, and the path loss value is the path loss value of the first uplink carrier.

Optionally, the transceiver unit 1201 is further configured to send sixth uplink transmission to a first network device on the first uplink carrier, where the path loss value is related to second uplink transmission.

Optionally, the transceiver unit 1201 is further configured to send transmit power information of the sixth uplink transmission, where the path loss value is related to transmit power of the second uplink transmission.

For example, the first uplink carrier is an SUL carrier of a second uplink carrier.

For example, a serving cell in which the first uplink carrier is located and a serving cell in which the second uplink carrier is located are a same serving cell: or the first uplink carrier and the second uplink carrier are configured by using an SIB1.

In a specific implementation, the communication apparatus may be specifically configured to implement the methods performed by the first network device in embodiments in FIG. 7 to FIG. 11. The apparatus may be the first network device, or may be a chip, a chipset, or a part of a chip, where the chip and the chipset are in the first network device, and the part of the chip is configured to perform a function of a related method. The processing unit 1202 is configured to determine a path loss value of a first uplink carrier, where the path loss value is used to determine transmit power of first uplink transmission on the first uplink carrier. The transceiver unit 1201 is configured to send the path loss value.

Optionally, the transceiver unit 1201 is further configured to receive second uplink transmission sent by the terminal device on the first uplink carrier. When determining the path loss value, the processing unit 1202 is specifically configured to determine the path loss value based on the second uplink transmission.

Optionally, the transceiver unit 1201 is further configured to receive transmit power information of the second uplink transmission. When determining the path loss value based on the second uplink transmission, the processing unit 1202 is specifically configured to: measure the second uplink transmission to obtain a measurement value; and determine the path loss value based on the transmit power information and the measurement value of the second uplink transmission.

For example, the first uplink carrier is an SUL carrier of a second uplink carrier.

For example, a serving cell in which the first uplink carrier is located and a serving cell in which the second uplink carrier is located are a same serving cell: or the first uplink carrier and the second uplink carrier are configured by using an SIB1.

Division into the modules in embodiments of the present disclosure is an example, is merely division into logical functions, and may be other division during actual implementation. In addition, functional modules in embodiments of the present disclosure may be integrated into one processor, each of the modules may exist alone physically, or two or more modules may be integrated into one module. The integrated module may be implemented in a form of hardware, or may be implemented in a form of a software functional module. It may be understood that for functions or implementations of the modules in embodiments of the present disclosure, further refer to related descriptions in the method embodiments.

Figure 13:
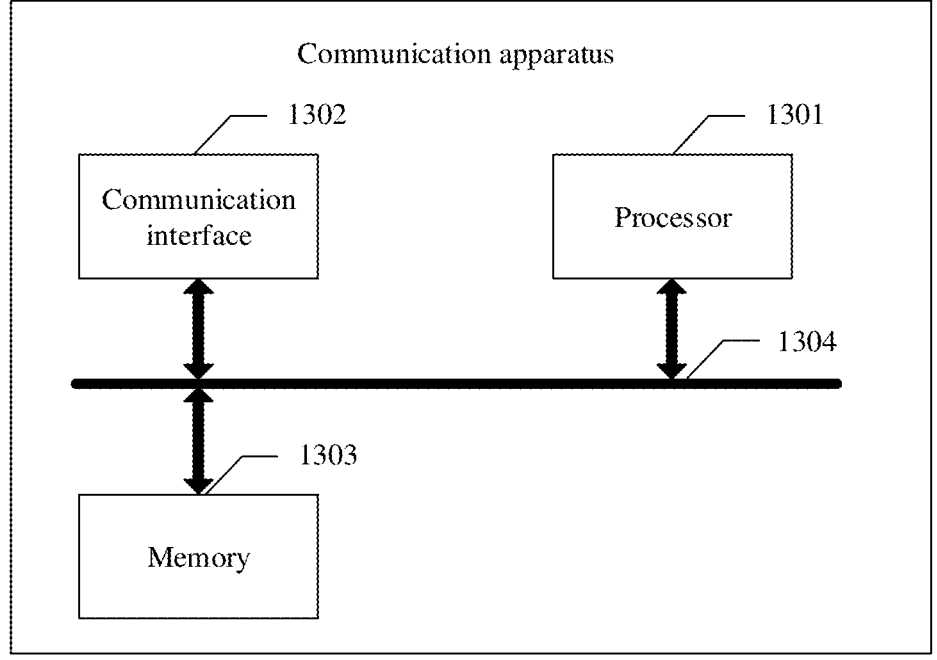
FIG. 13 is a schematic diagram of a structure of a communication apparatus according to an embodiment of the present disclosure.

In a possible manner, the communication apparatus may be shown in FIG. 13. The communication apparatus may be a communication device or a chip in the communication device. The communication device may be a terminal device, or may be a network device. The apparatus may include a processor 1301, a communication interface 1302, and a memory 1303. The processing unit 1202 may be the processor 1301. The transceiver unit 1201 may be the communication interface 1302.

The processor 1301 may be a central processing unit (CPU), a digital processing unit, or the like. The communication interface 1302 may be a transceiver, an interface circuit such as a transceiver circuit, a transceiver chip, or the like. The apparatus further includes a memory 1303, configured to store a program executed by the processor 1301. The memory 1303 may be a nonvolatile memory such as a hard disk drive (HDD) or a solid-state drive (SSD), or may be a volatile memory such as a random access memory (RAM). The memory 1303 is any other medium capable of carrying or storing expected program code in a form of instructions or data structures and capable of being accessed by a computer, but is not limited thereto.

The processor 1301 is configured to execute the program code stored in the memory 1303, and is specifically configured to perform an action of the processing unit 1202. Details are not described herein again in the present disclosure. The communication interface 1302 is specifically configured to perform an action of the transceiver unit 1201. Details are not described in the present disclosure again.

A specific connection medium between the communication interface 1302, the processor 1301, and the memory 1303 is not limited in this embodiment. In this embodiment of the present disclosure, the memory 1303, the processor 1301, and the communication interface 1302 are connected to each other through a bus 1304 in FIG. 13. The bus is represented by using a bold line in FIG. 13. A connection manner between other components is merely an example for description, and is not limited thereto. The bus may be classified into an address bus, a data bus, a control bus, and the like. For ease of representation, only one bold line is used to represent the bus in FIG. 13, but this does not mean that there is only one bus or only one type of bus.

An embodiment of the present invention further provides a computer-readable storage medium, configured to store computer software instructions that need to be executed for execution of the foregoing processor, and the computer-readable storage medium includes a program that needs to be executed for execution of the foregoing processor.

A person skilled in the art should understand that embodiments of the present disclosure may be provided as a method, a system, or a computer program product. Therefore, the present disclosure may use a form of hardware only embodiments, software only embodiments, or embodiments with a combination of software and hardware. In addition, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the methods, the device (system), and the computer program product according to the present disclosure. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of another programmable data processing device generate an apparatus for implementing a specific function in one or more procedures in the flowcharts and/or in one or more blocks in the block diagrams.

The computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clearly that a person skilled in the art can make various modifications and variations to the present disclosure without departing from the spirit and scope of the present disclosure. The present disclosure is intended to cover these modifications and variations of the present disclosure provided that they fall within the scope of protection defined by the following claims and their equivalent technologies.

What is claimed is:

1. A communication method performed by a terminal device or a chip in a terminal device, comprising:
   obtaining, from a second network device, a path loss value of a first uplink carrier at a first network device, wherein transmit power of first uplink transmission on the first uplink carrier is determined using the path loss value; and
   using the transmit power to send the first uplink transmission on the first uplink carrier to the first network device,
   wherein the first uplink carrier is a supplementary uplink (SUL) carrier of a second uplink carrier at the second network device, and the SUL carrier has no corresponding downlink carrier,
   wherein the transmit power is determined by using a target power value, the path loss value, a path loss compensation factor, a quantity of transmission resource blocks, a modulation and coding scheme, and a closed-loop power control parameter.

2. The method according to claim 1, further comprising:
   sending second uplink transmission to a network device on the first uplink carrier, wherein the path loss value is related to the second uplink transmission.

3. The method according to claim 2, wherein the method further comprises:
   sending transmit power information of the second uplink transmission, wherein the path loss value is related to transmit power of the second uplink transmission.

4. The method according to claim 2, wherein the path loss value of the first uplink carrier is determined at the first network device based on the second uplink transmission and sent to the second network device.

5. The method according to claim 4, wherein the path loss value of the first uplink carrier is determined based on transmit power information of the second uplink transmission and a measurement value of the second uplink transmission, and the measurement value is obtained at the first network device by measuring the second uplink transmission.

6. The method according to claim 1, wherein the first uplink carrier and the second uplink carrier are located in a same serving cell; or
   the first uplink carrier and the second uplink carrier are configured by using a system information block 1 (SIB1).

7. The method according to claim 1, wherein the path loss value of the first uplink carrier is determined at the first network device and sent to the second network device.

8. The method according to claim 1, wherein after receiving the path loss value of the first uplink carrier, the method further comprises:
   determining second transmit power of fourth uplink transmission on the first uplink carrier based on the path loss value; and
   using the second transmit power to send the fourth uplink transmission on the first uplink carrier, wherein a time interval between a receiving moment of the path loss value and a sending moment of the fourth uplink transmission does not exceed a preset threshold.

9. A communication apparatus, being a terminal device or a chip in a terminal device, comprising:
   at least one processor; and
   a memory storing programming instructions that, when executed by the at least one processor, cause the communication apparatus to perform operations comprising:
   obtaining, from a second network device, a path loss value of a first uplink carrier at a first network device, wherein transmit power of first uplink transmission on the first uplink carrier is determined using the path loss value; and using the transmit power to send the first uplink transmission on the first uplink carrier to the first network device, wherein the first uplink carrier is a supplementary uplink (SUL) carrier of a second uplink carrier at the second network device, and the SUL carrier has no corresponding downlink carrier, wherein the transmit power is determined by using a target power value, the path loss value, a path loss compensation factor, a quantity of transmission resource blocks, a modulation and coding scheme, and a closed-loop power control parameter.

10. The apparatus according to claim 9, wherein the path loss value of the first uplink carrier is determined at the first network device and sent to the second network device.

11. The apparatus according to claim 9, wherein after receiving the path loss value of the first uplink carrier, the operations further comprises:

determining second transmit power of fourth uplink transmission on the first uplink carrier based on the path loss value; and using the second transmit power to send the fourth uplink transmission on the first uplink carrier, wherein a time interval between a receiving moment of the path loss value and a sending moment of the fourth uplink transmission does not exceed a preset threshold.

12. The apparatus according to claim 9, wherein the operations further comprise:

sending second uplink transmission to a network device on the first uplink carrier, wherein the path loss value is related to the second uplink transmission.

13. The apparatus according to claim 12, wherein the operations further comprise:

sending transmit power information of the second uplink transmission, wherein the path loss value is related to transmit power of the second uplink transmission.

14. The apparatus according to claim 12, wherein the path loss value of the first uplink carrier is determined at the first network device based on the second uplink transmission and sent to the second network device.

15. The apparatus according to claim 14, wherein the path loss value of the first uplink carrier is determined based on transmit power information of the second uplink transmission and a measurement value of the second uplink transmission, and the measurement value is obtained at the first network device by measuring the second uplink transmission.

16. The apparatus according to claim 9, wherein the first uplink carrier and the second uplink carrier are located in a same serving cell; or the first uplink carrier and the second uplink carrier are configured by using a system information block 1 (SIB1).

* * * * *